(12) United States Patent
Chu et al.

(10) Patent No.: US 9,093,091 B1
(45) Date of Patent: Jul. 28, 2015

(54) DETERMINATION OF READER TO WRITER CROSSTRACK OFFSET VIA A MAGNETIC DISK

(71) Applicant: Seagate Technology LLC, Cupertino, CA (US)

(72) Inventors: Alfredo Sam Chu, Prior Lake, MN (US); Siew Kin Chow, Shakopee, MN (US)

(73) Assignee: SEAGATE TECHNOLOGY LLC, CUPERTINO, CA (US)

( * ) Notice: Subject to any disclaimer, the term of this patent is extended or adjusted under 35 U.S.C. 154(b) by 0 days.

(21) Appl. No.: 14/492,876

(22) Filed: Sep. 22, 2014

(51) Int. Cl.
| | |
|---|---|
| *G11B 11/00* | (2006.01) |
| *G11B 5/48* | (2006.01) |
| *G11B 5/31* | (2006.01) |
| *G11B 5/60* | (2006.01) |
| *G11B 5/012* | (2006.01) |
| *G11B 13/08* | (2006.01) |
| *G11B 5/00* | (2006.01) |

(52) U.S. Cl.
CPC .............. *G11B 5/4866* (2013.01); *G11B 5/314* (2013.01); *G11B 5/6088* (2013.01); *G11B 5/012* (2013.01); *G11B 13/08* (2013.01); *G11B 2005/0021* (2013.01)

(58) Field of Classification Search
CPC .......... G11B 5/59627; G11B 5/59683; G11B 27/36; G11B 5/12; G11B 222/20; G11B 5/56; G11B 5/012; G11B 5/4886
USPC .............. 360/31, 77.06, 76, 53, 77.02, 78.04, 360/77.04
See application file for complete search history.

(56) References Cited

U.S. PATENT DOCUMENTS

| | | | |
|---|---|---|---|
| 5,914,967 A * | 6/1999 | Yomtoubian ................. 714/718 |
| 6,067,205 A * | 5/2000 | Mathews et al. ........... 360/77.04 |
| 6,320,718 B1* | 11/2001 | Bouwkamp et al. ....... 360/77.04 |
| 6,519,107 B1* | 2/2003 | Ehrlich et al. ................. 360/75 |
| 6,650,491 B2* | 11/2003 | Suzuki et al. ................. 360/31 |
| 6,798,606 B2* | 9/2004 | Tang et al. ................. 360/77.08 |
| 6,873,488 B2 | 3/2005 | Teo et al. |
| 2006/0056092 A1 | 3/2006 | Ehrlich et al. |
| 2006/0056093 A1 | 3/2006 | Ehrlich et al. |
| 2006/0109578 A1 | 5/2006 | Zayas |
| 2007/0279782 A1 | 12/2007 | Rydhan |

* cited by examiner

*Primary Examiner* — Ali Neyzari
(74) *Attorney, Agent, or Firm* — Hollingsworth Davis, LLC

(57) ABSTRACT

A pattern is written to only a portion of a test track of a magnetic disk. The pattern written to the portion of the test track is read using a read head. A cross-track offset between the read head and a write head is determined at a position on a disk based on reading the pattern.

17 Claims, 6 Drawing Sheets

DETERMINATION OF READER TO WRITER CROSSTRACK OFFSET VIA A MAGNETIC DISK

SUMMARY

Some embodiments involve a method of writing a pattern to only a portion of a test track of a magnetic disk. The pattern written to the portion of the test track is read using a read head. A cross-track offset between the read head and a write head is determined at a position on a disk based on reading the pattern.

Some embodiments involve an apparatus that comprises a controller configured for use with a read head and a write head. The controller is configured to write a pattern to only a portion of a test track of a magnetic disk, read the pattern written to the portion of the test track using a read head, and determine a cross-track offset between the read head and a write head at a position on a disk based on reading the pattern.

Some embodiments involve a non-transitory, computer-readable storage medium configured with instructions executable by a controller of an apparatus to perform writing a pattern to only a portion of a test track of a magnetic disk, reading the pattern written to the portion of the test track using a read head, and determining a cross-track offset between the read head and a write head at a position on a disk based on reading the pattern.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The figures are not necessarily to scale.

DETAILED DESCRIPTION

Figure 1:
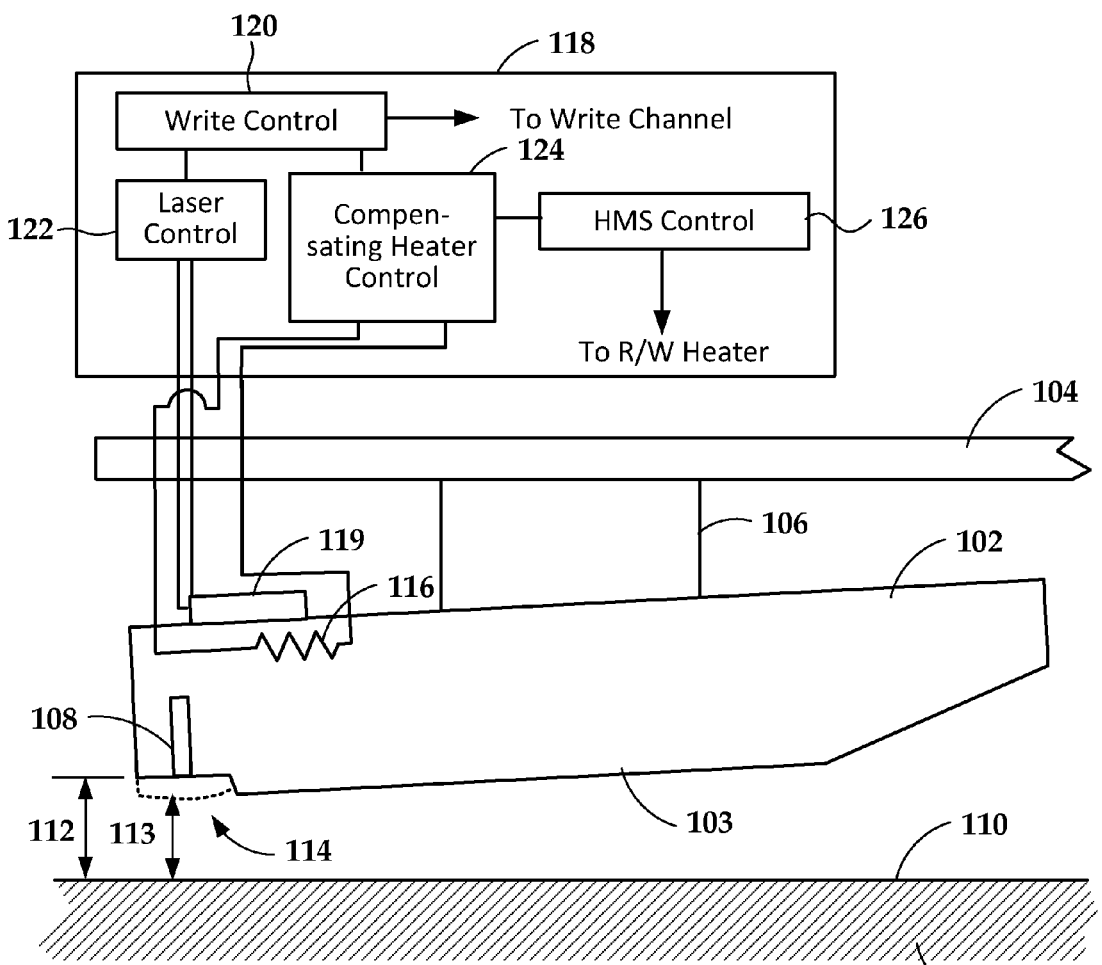
FIG. 1 illustrates a slider according to some embodiments.

The present disclosure is generally related to an apparatus (e.g., a HAMR storage device) having a magnetic recording media, and a read/write head communicatively coupled to the magnetic recording media. The recording head includes a write coil and a heat source such as a laser. A HAMR read/write element, sometimes referred to as a slider, recording head, or read/write head, includes magnetic read and write transducers similar to those on conventional hard drives. For example, data may be read by a magnetoresistive sensor that detects magnetic fluctuations of a magnetic medium as it moves underneath the sensor. Data may be written to the magnetic medium by a write coil that is magnetically coupled to a write pole. The write pole changes magnetic orientation in regions of the media as it moves underneath the write pole. A HAMR device will also generally utilize a source of energy/heat, such as a laser diode, to heat the media while it is being written to by the write pole. An optical delivery path may be integrated into the HAMR slider to deliver the energy to the surface of the media.

The optical delivery path of a HAMR slider may include a near-field transducer (NFT) proximate a media-facing surface (e.g., air-bearing surface, contact surface). The NFT shapes and transmits the energy to a small region on the recording medium. The NFT is sometimes referred to as an optical antenna, surface plasmon resonator, etc., and may include a plasmonic metal such as gold, silver, copper, aluminum, etc., and alloys thereof. The NFT for a HAMR device creates a localized region of high power density in the media through an electromagnetic interaction. This results in a high temperature rise in a small region on the media, with the region exceeding the Curie temperature having dimensions less than 100 nm. This also results in high temperature rise in the slider near the NFT due to optical losses in the delivery path.

The storage device includes a spindle motor for rotation at a constant high speed. Each surface of a disk is divided into tracks that are arranged as concentric circles similar in layout to the annual growth rings of a tree. Each track may include a number of data sectors and servo sectors. A data sector is normally the smallest individually addressable unit of information stored in a disk drive and may hold 512 bytes or more of information plus additional bytes for internal drive control and error detection and correction.

A servo sector is a particular magnetic signature between data sectors on a track located. The servo sector facilitates identifying tracks and positioning of heads over tracks. The servo bursts may include, among other things, address marks which identifies the respective tracks and data sectors, and burst fields that facilitate determining position errors. In some implementations, the data sectors are written at an offset from the servo sectors in order to take into account the presence of the reader-to-writer offset Generally, each of the multiple discs in a disc drive may have associated with it two heads (one adjacent the top surface of the disc and another adjacent the bottom) for writing and reading data to or from a sector. Each head is mounted at the distal end of an actuator arm that extends toward the disc and pivots about the bearing shaft assembly connected to a voice coil motor in the disc drive. Each head may include a reader and a writer facing the disc. The reader and writer may be aligned with each other along the longitudinal axis of the actuator arm.

The head skew angle, which is the angle between a tangential line to a track and the line drawn along the longitudinal axis of the actuator arm, changes as the head moves from the inner diameter to the outer diameter of the disc, and vice versa. This varying radial distance between the reader and the writer is known as the reader-to-writer offset.

In some cases, in order to calibrate the reader to writer offset, multiple entire tracks are written and read back at various positions along in inner diameter and the outer diameter of the disk. In a HAMR device, the NFT can be vulnerable to wear with excessive writing during the calibration process. According to various embodiments described herein a pattern is written to only a portion of a test track. The pattern is written to the portion of the test track using a write head. A cross-track offset between the read head and a write head is determined at a position on a disk based on reading the pattern. Writing the pattern to only the portion of at least one test track reduces a duty cycle of a laser and near-field-transducer (NFT) during the writing and may reduce the amount of wear that the NFT experiences during the calibration process.

FIG. 1 illustrates a slider 102 according to some embodiments. The slider 102 is coupled to an arm 104 by way of a suspension 106 (e.g., gimbal) that allows some relative motion between the slider 102 and arm 104. The slider 102 includes read/write elements 108 (e.g., transducers) at a trailing edge that are held proximate to a surface 110 of a magnetic recording medium, e.g., disk 111. The NFT is located between the read and write elements. The slider 102 is located over surface 110 of disk 111, a flying height 112 is maintained between the slider 102 and the surface 110 by a downward force of arm 104. This downward force is counterbalanced by an air cushion that exists between the surface 110 and an air bearing surface 103 of the slider 102 when the disk 111 is rotating.

It is desirable to maintain a predetermined slider flying height 112 over a range of disk rotational speeds during both reading and writing operations to ensure consistent performance. A region 114 is a "close point" of the slider 102, which is generally understood to be the closest point of contact between the slider 102 and the magnetic recording medium 111, and generally defines the HMS 113. As described above, heating from HAMR optical components can affect the HMS 113. This is shown in FIG. 1 by dotted line that represents a change in geometry of the region 114. In this example, the geometry change may be induced, in whole or in part, by an increase or decrease in temperature of the region 114 due to different thermal expansion properties of the respective materials surrounding the region.

In various embodiments described below, the slider 102 may include one or more heaters 116 that are designed to compensate for HAMR heating effects. The heater 116 may be positioned close to a top mounted laser 119 as shown here. A controller 118 can be coupled to the heater 116 to control when the heater 116 is switched on, and optionally to control an amount of power applied to the heater 116.

The controller 118 includes a write control module 120 that controls various aspects of the device during write operations. For a HAMR device, writing involves activating the laser 119 while writing to the media, which is indicated by way of laser control module 122. The laser control module 122 includes circuitry that switches the laser 119 on and off, e.g., in response to a command from write control module 120. A compensating heater control 124 switches heater 116 on and off inversely to the laser 119 to minimize thermal changes within the slider 102 when the laser 119 is switched on and off.

The slider 102 may also include other heaters (not shown) that actively control HMS 113 during device operation, as indicated by HMS control module 126. The other heaters may be associated with one or both of the read/write elements 108. The HMS control module actively adjusts HMS 113 during respective read and write operations. The activities of the HMS control module 126 may be coordinated with the compensating heater control module 124. For example, a magnitude of signals sent from the compensating heater control 124 may be modified so as to complement (or at least not interfere with) HMS heating operations.

Figure 2:
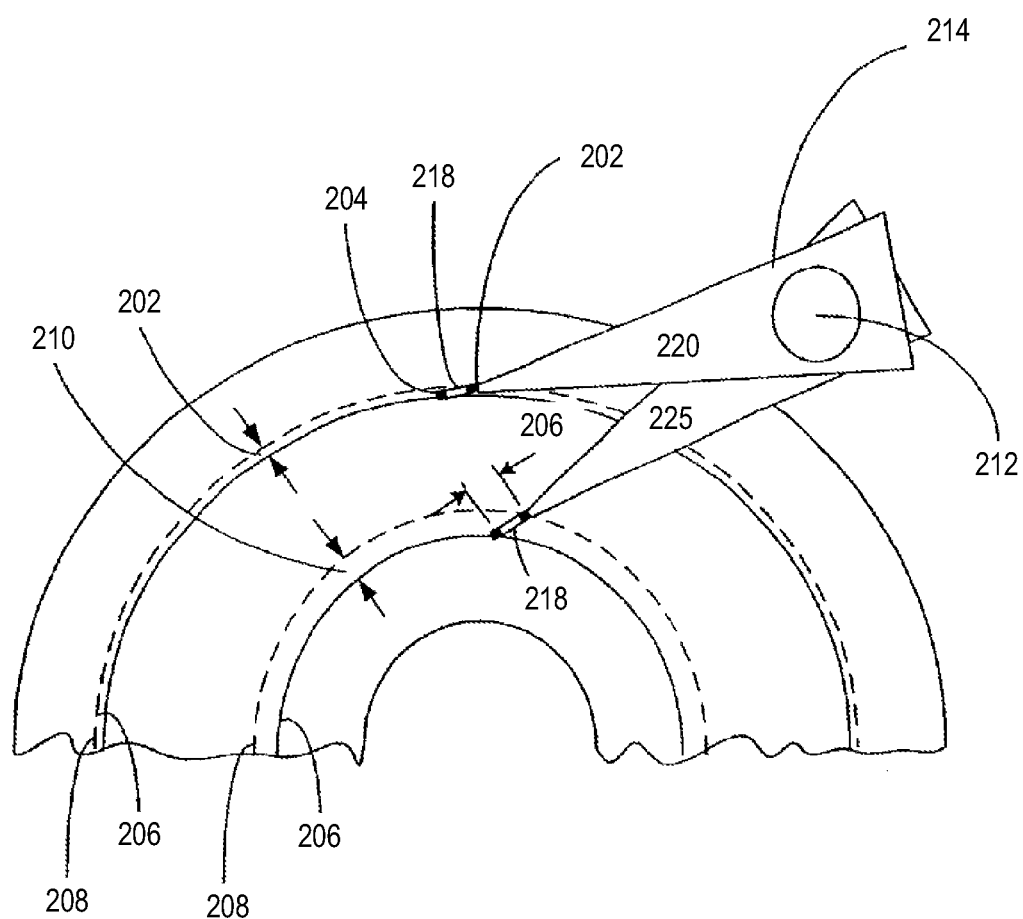
FIG. 2 shows a separate reader and a writer mounted on the head in accordance with embodiments described herein.

FIG. 2 shows a separate reader 202 and a writer 204 mounted on the head 218 that is mounted at the distal end of the rotary actuator arm 214, which pivots about the bearing shaft assembly 212. A gap 206 along the longitudinal axis of the actuator assembly arm 214 exists between the reader 202 and the writer 204. The head skew angle, which is the angle between a tangential line to a track and the line drawn along the longitudinal axis of the actuator arm 214, changes as the head 218 moves from the inner diameter to the outer diameter of the disc, and vice versa. The combination of the gap 206 and the varying head skew angle causes the radial distance defined by the reader-to-writer offset 210 between the path of the reader 208 and the path of the writer 206 to vary as the head 118 moves from the inner diameter to the outer diameter of the disc 108, and vice versa. For example, position 220 of the actuator arm 214 is located along an outer diameter of the disk and position 225 of the actuator arm is located along an inner diameter. As shown, the angle of the head relative to disk is different in these two cases, resulting in different skews of the read/write head when writing in the inner regions of the disk as compared to writing in the outer regions of the disk.

Figure 3A:
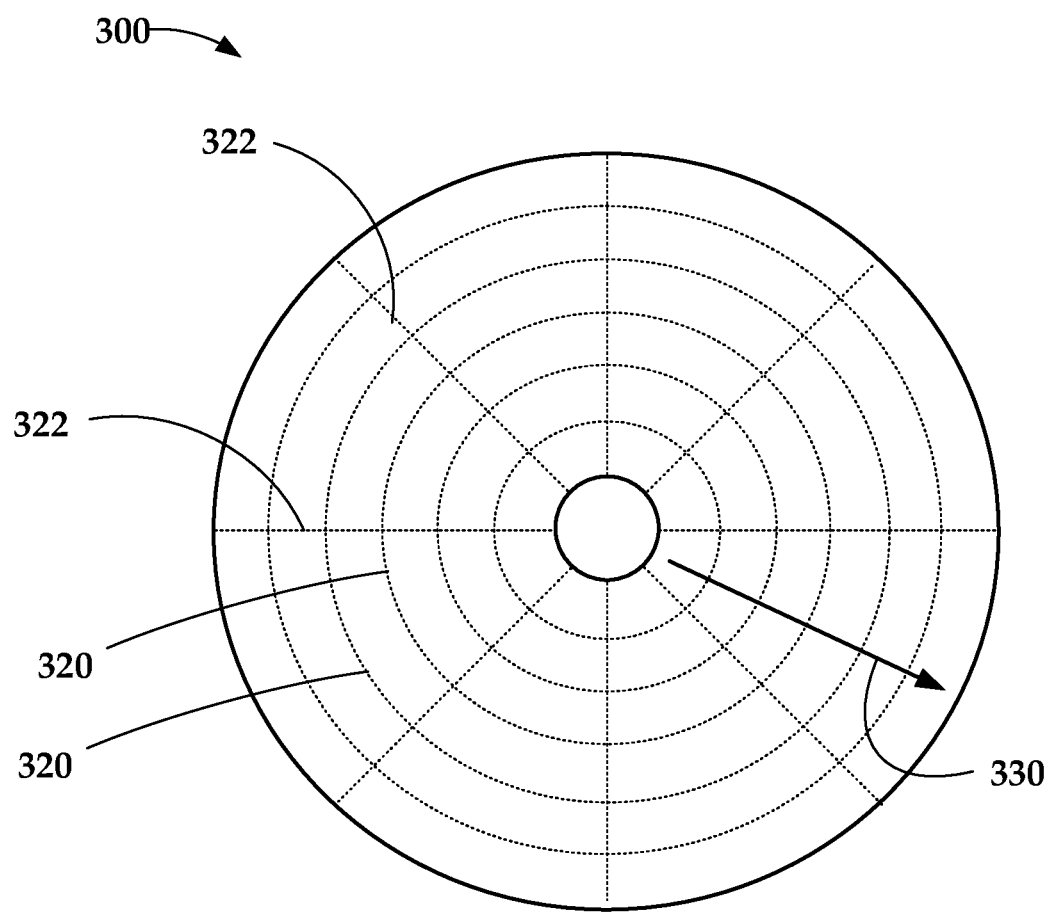
FIGS. 3A-3B illustrates a disk according to various aspects.

FIG. 3A illustrates a disk 300 in accordance with embodiments described herein. The disk 300 includes circular, concentric data tracks 320. The tracks may be broken up into wedges 322. Generally, the wedges 322 correspond to individual servo wedges and so there may be thousands of wedges per track. Further, the number of wedges per track may change from inner to outer diameter. As described previously, the reader to writer offset may change with respect to whether the head is reading an inner diameter track or an outer diameter track. Line 330 represents the range from inner diameter tracks to outer diameter tracks.

Figure 3B:
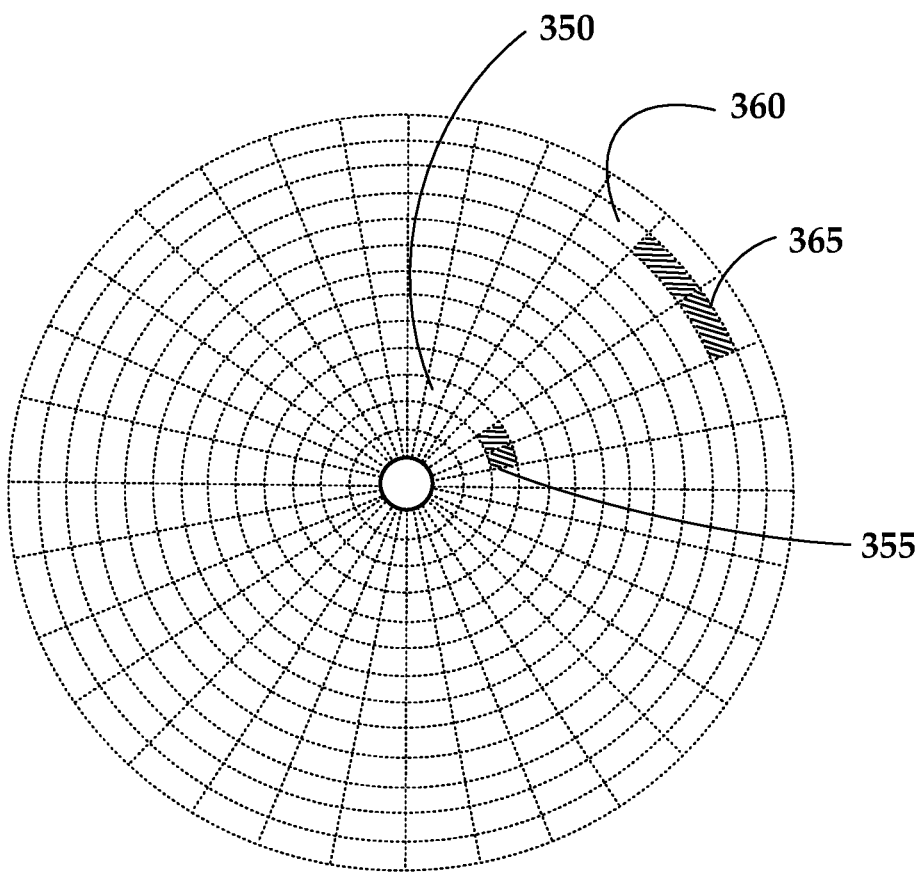

FIG. 3B show another view of a disk 300. Test tracks 350, 360 are selected. The test tracks 350, 360 may be selected by selecting a number of tracks equally spaced on the disk. In some cases, the test tracks are not equally spaced. A predetermined number of test tracks may be selected in the inner diameter, the outer diameter, and/or the middle region of the disk. According to FIG. 3B the first test track 350 is selected at an inner diameter of the disk and the second test track 360 is selected at an outer diameter of the disk. In some cases, more than one test track is selected at both of the inner diameter and outer diameter locations on the disk. One or more tracks along the middle diameter may also be selected. The calibration process may start at a location on the disk with substantially zero skew and cycle through different skew values. The location on the disk with substantially zero skew occurs where there is no added offset in addition to the default offset between the reader and the writer.

In some cases, at least a portion of at least one test track is checked to determine if it contains any defects. For example, two wedges of a test track are checked. In some cases, the first two wedges of the test track are checked. If it is determined that at least a portion of the test track has a number of defects above a threshold, a number of tracks may be skipped, e.g. 25 tracks, and it is determined if the new test track has any defects. The process may continue to check for defects until a test track is found that has defects below the threshold. In some cases, the process may continue to check for a test track below a threshold a limited number of times, e.g. 10 times.

As described previously, the test pattern is written to only a portion of each of the test tracks. Here, a pattern is written to only a portion 355 of the first test track 350. According to FIG. 3B, the portion 355 of the first test track 350 is two wedges (not shown to scale). In some cases, the pattern is written to more or fewer wedges of the test track. Similarly, a test pattern is written to only a portion 365 of the second test track 360 (not shown to scale). In some cases, the test pattern is not necessarily written to the same number of wedges in each of the test tracks and/or the test pattern is not written to consecutive wedges. According to various implementations, the portion of any or all of the test tracks is a formatted super sector. A super sector is taken from a floating edge of a servo wedge to the rising edge of the next wedge. The reader reads the data back at various positions along the test track to determine the reader-writer offset.

Figure 4:
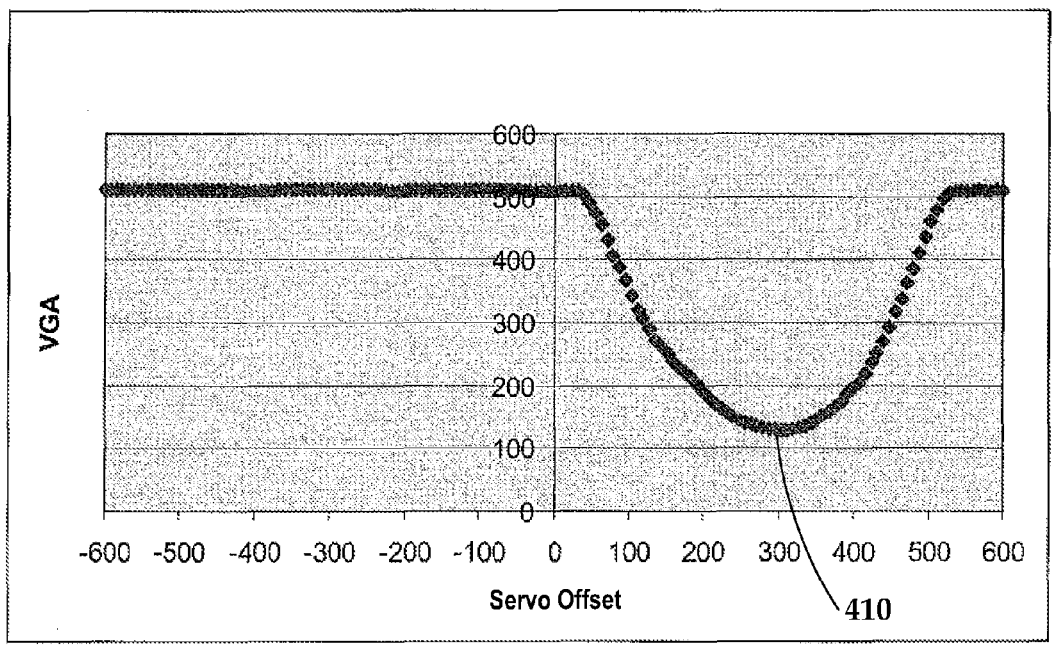
FIG. 4 illustrates the output VGA value for various servo offsets.

According to embodiments described herein, the reader reads the test pattern back using various offsets to determine the reader-writer offset. For example, the reader may read the portion of the test track starting at a servo offset of −512 and continuing until a servo offset of 512 with a step size of two servo counts as shown in FIG. 4. The servo counts (horizontal axis) in this example correspond to a relative digital-to-analog converter (DAC) value input to the arm drive servo (e.g., servo motor and microactuator). While reading, a variable gain amplifier (VGA) amplifies the readback signal depending on the amplitude of the signal. FIG. 4 illustrates the VGA value for various servo offsets.

The output VGA value in FIG. 4 is inversely proportional to the signal read from the disk. When the reader is directly over the test pattern, the signal that is read has higher amplitude than when the reader is offset from the test pattern. The higher amplitude signal results in a lower gain value. Thus, bottom peak 410 represents the offset where the reader is closest to the test pattern. In the example of FIG. 4 the minimum value is at about 300 servo offset. Therefore, in this example and at this particular position along the disk, the offset is about 300 units. This servo offset defines how much the offset needs to be adjusted at this particular test location. According to various embodiments, a default value for the reader-writer offset is defined at manufacturing. A table may be provided that contains a default value for various positions on the disk. Therefore, the 300 servo offset value may represent the default value added to a variable (K) as shown in Equation 1. In this case, if the default value is 100, then K is 200.

$$\text{Offset} = \text{Default} + K \quad \text{Equation 1}$$

Figure 5:
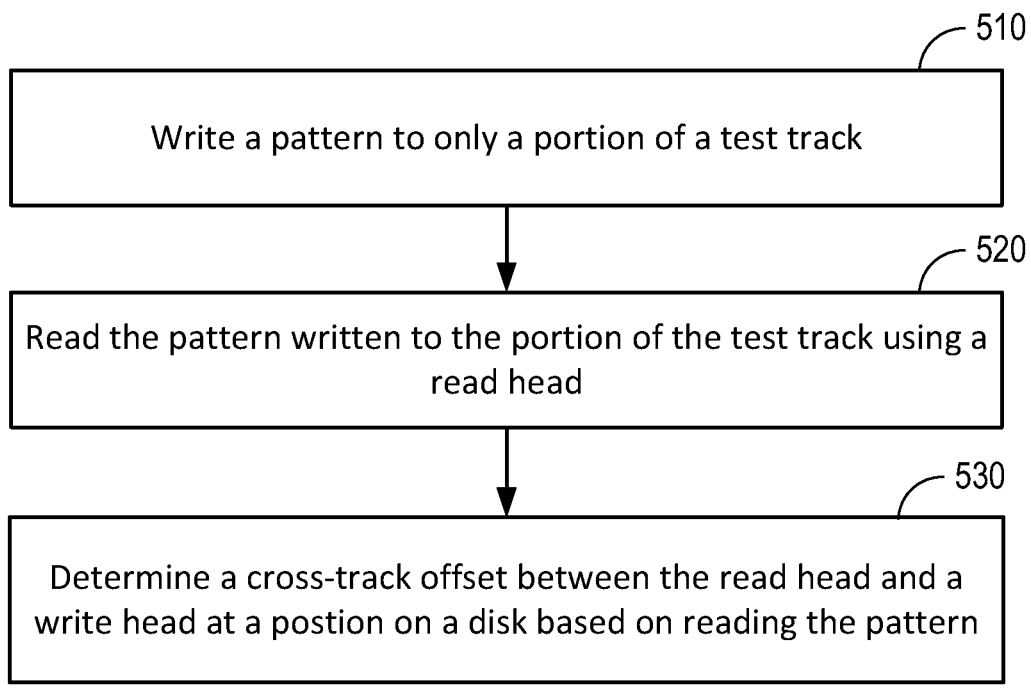
FIG. 5 illustrates a flow diagram in accordance with various embodiments described herein.

FIG. 5 illustrates a flow diagram in accordance with various embodiments described herein. A pattern is written 510 to only a portion of a test track. The portion of the test track may be two wedges of the test track, for example. In some cases, before the pattern is written 510 to only a portion of the test track, it is determined if there is data on the portion of the test track. If it is determined that there is data on the portion of the test track, at least a portion of the test track is erased. In some cases, at least portions of tracks adjacent to the test track are erased. According to some embodiments, a band of two wedges on both sides of the test track are erased.

The pattern written to the portion of the test track is read 520 using a read head. A cross-track offset between the read head and a write head at a position on a disk is determined based on reading the pattern. As described previously, the reader reads the test pattern back using various offsets to determine the reader-writer offset. For example, the reader may read the portion of the test track starting at a servo offset of −512 and continuing until a servo offset of 512 with a step size of two servo counts as shown in FIG. 4. In some cases, the step size is user defined. At each step, the test may remember the previous servo offset value. As stated previously, the test may start at a location having substantially zero skew. The test may then move on to determine servo offsets for positive skews and negative skews. Once all the servo offsets are determined for all of the test tracks, the points can be fit to a function F (e.g., a sixth order polynomial) and the coefficients (e.g., $a_1, a_2, \ldots, a_n$) stored to the drive (e.g., at a zero skew location on the disk or to a non-volatile, solid-state memory). In some cases, the extreme outer diameter and inner diameter points that may be outside the logical range can be extrapolated. Thereafter, upon initialization, the drive controller reads in the polynomial coefficients and determines an offset based on track id, where $\text{Offset} = F(\text{Track\_ID}, a_1, a_2, \ldots, a_n)$.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
   writing a pattern to only a portion of a test track of a magnetic disk, the magnetic disk comprising a heat-assisted magnetic recording (HAMR) medium, wherein writing the pattern to only the portion of the test track reduces a duty cycle of a laser and near-field-transducer (NFT) during the writing;
   reading the pattern written to the portion of the test track using a read head; and
   determining a cross-track offset between the read head and a write head at a position on a disk based on reading the pattern.

2. The method of claim 1, wherein the portion of the test track includes no more than two wedges of the test track.

3. The method of claim 1, further comprising,
   writing the pattern to more than one test track, at least one of the more than one test track being an outer-diameter track and at least one of the more than one test tracks being an inner diameter track.

4. The method of claim 1, further comprising determining a cross-track offset between the read head and a write head on at least one inner diameter test track and at least one outer diameter test track.

5. The method of claim 1, further comprising writing the portion of the test track at a plurality of cross-track skew angles.

6. The method of claim 1, further comprising determining if the test track contains any defects.

7. The method of claim 1, further comprising
   determining if the portion of the test track contains data before writing a pattern to only a portion of a test track; and
   erasing the portion of the test track if it is determined that the portion of the test track contains data.

8. The method of claim 7, further comprising erasing a portion of adjacent tracks to the test track if it is determined that the portion of the test track contains data.

9. The method of claim 1, further comprising determining a cross-track offset between the read head and a write head at a position on a disk based on an amplitude of a readback signal.

10. An apparatus comprising:
   a controller configured for use with a read head and a write head, the controller configured to
      write a pattern to only a portion of a test track of a magnetic disk, the magnetic disk comprising a heat-assisted magnetic recording (HAMR) medium, wherein writing the pattern to only the portion of the test track reduces a duty cycle of a laser and near-field-transducer (NFT) during the writing;
      read the pattern written to the portion of the test track using the read head; and
      determine a cross-track offset between the read head and a write head at a position on the disk based on reading the pattern.

11. The apparatus of claim 10, wherein the portion of the test track includes no more than two wedges of the test track.

12. The apparatus of claim 10, wherein the controller is configured to write the pattern to more than one test track, at least one of the more than one test track being an outer-diameter track and at least one of the more than one test tracks being an inner diameter track.

13. The apparatus of claim 10, wherein the controller is configured to determine a cross-track offset between the read head and a write head on at least one inner diameter test track and at least one outer diameter test track.

14. The apparatus of claim 10, wherein the controller is further configured to:
   determine if the portion of the test track contains data before writing a pattern to only a portion of a test track; and
   erase the portion of the test track if it is determined that the portion of the test track contains data.

15. The apparatus of claim 14, further wherein the controller is further configured to erase a portion of adjacent tracks to the test track if it is determined that the portion of the test track contains data.

16. A non-transitory, computer-readable storage medium configured with instructions executable by a controller of an apparatus to perform:
   writing a pattern to only a portion of a test track of a magnetic disk, the magnetic disk comprising a heat-assisted magnetic recording (HAMR) medium, wherein writing the pattern to only the portion of the test track reduces a duty cycle of a laser and near-field-transducer (NFT) during the writing;
   reading the pattern written to the portion of the test track using a read head; and
   determining a cross-track offset between the read head and a write head at a position on a disk based on reading the pattern.

17. The non-transitory, computer-readable storage medium of claim 16, wherein the portion of the test track includes no more than two wedges of the test track.

* * * * *